… …

United States Patent [19]
Cohen et al.

[11] Patent Number: 6,075,913
[45] Date of Patent: Jun. 13, 2000

[54] OPTICAL COUPLER

[75] Inventors: Mitchell Simmons Cohen, Millwood, N.Y.; Barbara A. De Baun, Woodbury; Gordon D. Henson, Lake Elmo, both of Minn.; Glen Walden Johnson, Yorktown Heights, N.Y.; Stephen Louis Spanoudis, Lexington, Ky.

[73] Assignees: International Business Machines Corporation, Armonk, N.Y.; Lexmark International, Inc., Lexington, Ky.; Minnesota Mining and Manufacturing Company, St. Paul, Minn.

[21] Appl. No.: 09/032,423

[22] Filed: Feb. 27, 1998

Related U.S. Application Data

[63] Continuation-in-part of application No. 08/783,629, Jan. 14, 1997, abandoned, which is a continuation of application No. 08/508,937, Jul. 28, 1995, abandoned.

[51] Int. Cl.$^7$ .......................................... G02B 6/26
[52] U.S. Cl. ................................................... 385/47
[58] Field of Search ................................. 385/40–50, 147

[56] References Cited

U.S. PATENT DOCUMENTS 5,093,879   3/1992   Bregman et al. .

FOREIGN PATENT DOCUMENTS

| 4008483 | 9/1991 | Germany . |
| 404277701A | 10/1992 | Japan . |

OTHER PUBLICATIONS

The Photonics Design and Applications Handbook, "Fibers for Light Transmission," pp. 46.0–49.0, 1988.

N.S. Kapany, "Fiber Optics, Principles and Applications," Academic Press, pp. 13–17, 1967.

Fiberoptic Engineering Corporation, "Fiberoptic Engineering Corporation Presents Mark 1," pp. 1–10, Jul. 1985.

K. Sano et al., "Optical Mixer with Graded–index Slab Waveguide," 4th Tropical Meeting on Gradient–Index Optical Imaging Systems, pp. 1–4.

M. Oikawa et al., "Stacked Array Components with Distributed–Index Planar Microlens," 4th Topical Meeting on Gradient–Index Optical Imaging Systems, pp. 1–4.

N. Yamamoto et al., "Imaging at Unit Magnification with Two–Dimensional Planar Microlens Array," 4th Topical Meeting on Gradient–Index Optical Imaging Systems, pp. 1–4.

*Primary Examiner*—Akm E. Ullah
*Attorney, Agent, or Firm*—Ryan & Mason, L.L.P.; Robert P. Tassinari, Jr.; Paul J. Otterstedt

[57] ABSTRACT

An optical coupler. The coupler has an optical element for transferring an optical signal from an entrance region, external to the optical unit, to an exit region, also external to the optical unit. The coupling element has a first substantially planar transmitting surface lying in a first plane, a second substantially planar transmitting surface lying in a second plane not coplanar with the first plane, a first substantially planar reflecting surface substantially perpendicular to the first transmitting surface, and a second substantially planar reflecting surface substantially parallel to the first reflecting surface, and a shaped reflecting surface substantially perpendicular to and adjoining the first and second reflecting surfaces.

2 Claims, 8 Drawing Sheets

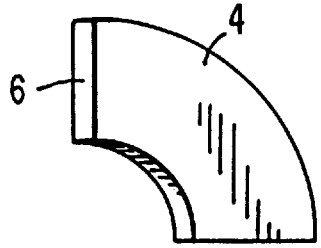
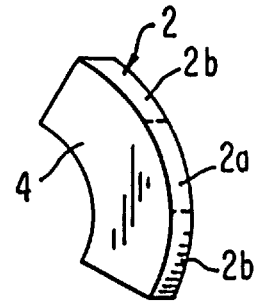
FIG. 1a  FIG. 1b
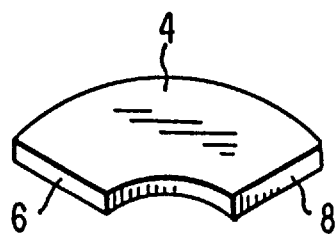
FIG. 1c
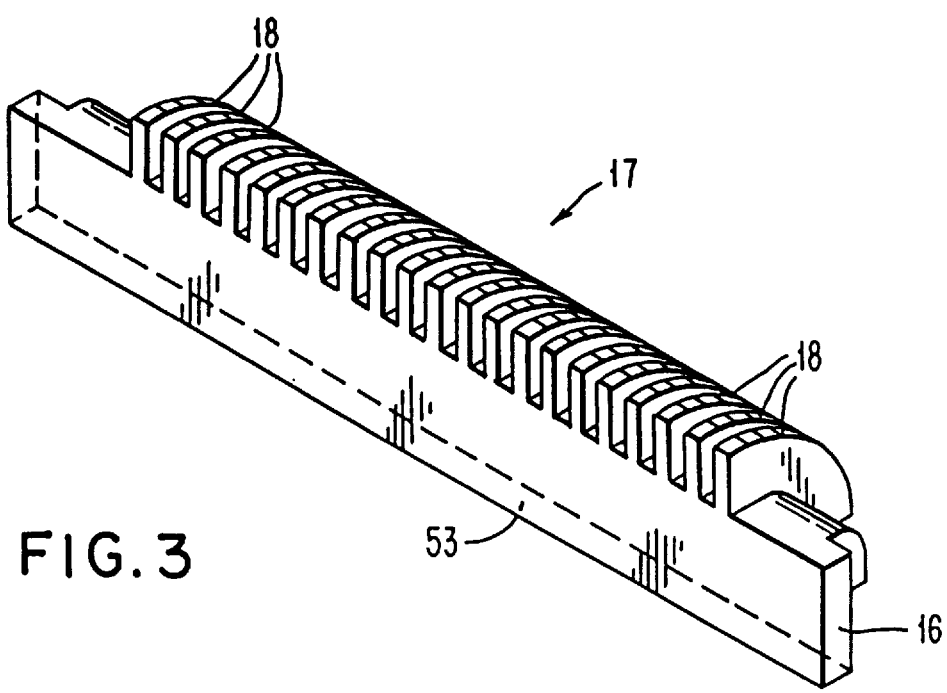
FIG. 3

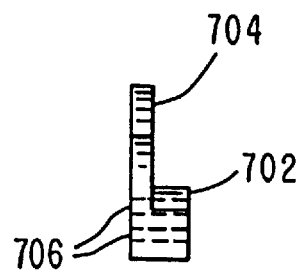
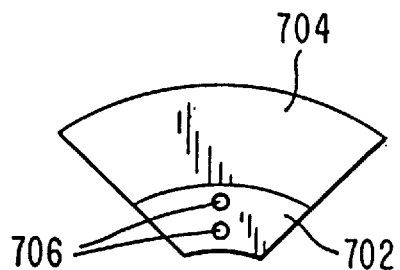
FIG. 7a    FIG. 7b
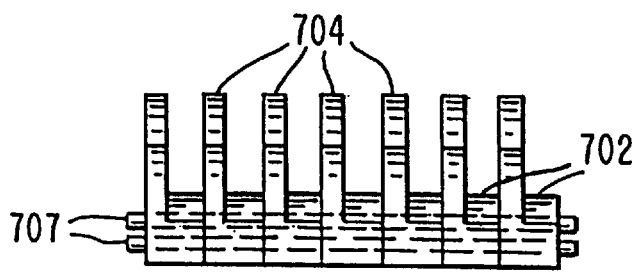
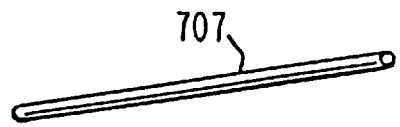
FIG. 7c    FIG. 7d

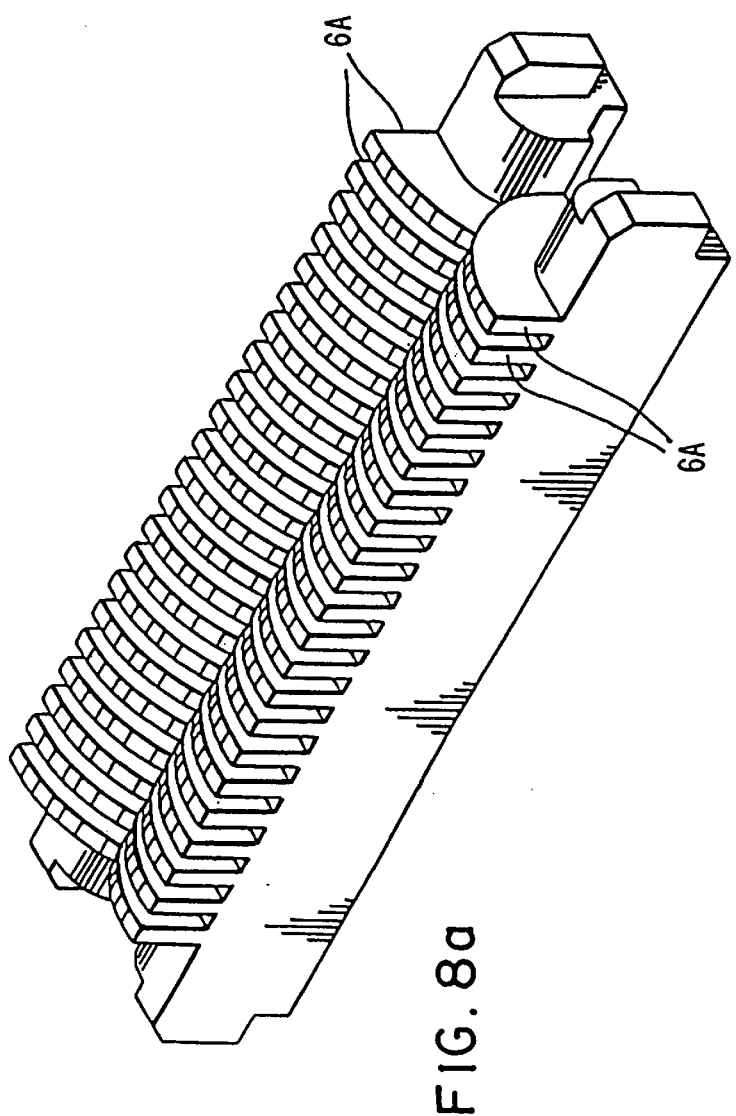
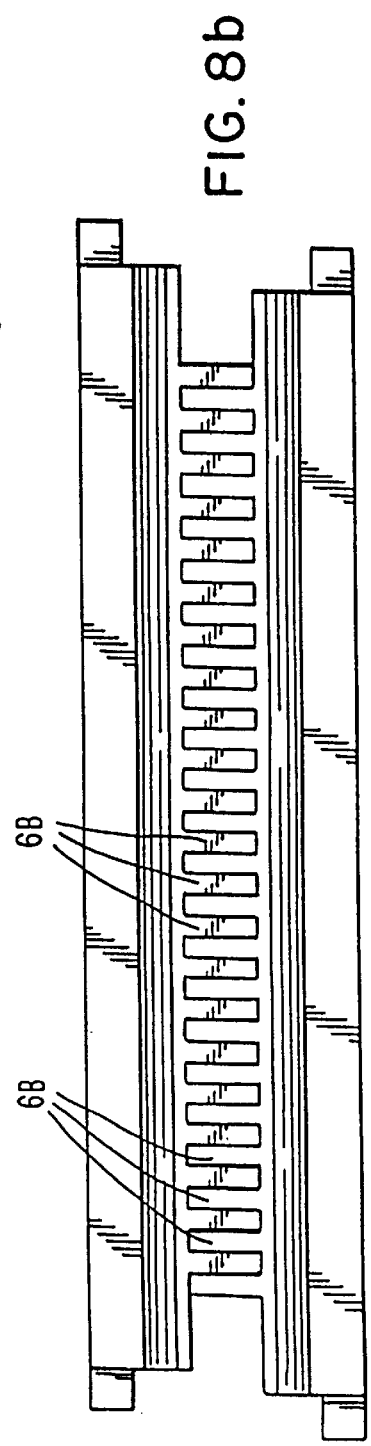

OPTICAL COUPLER

This is a continuation-in-part of U.S. application Ser. No. 08/783,629, filed Jan. 14, 1997, now abandoned which is a continuation of U.S. application Ser. No. 08/508,937, filed Jul. 28, 1995 now abandoned.

The invention was made with government support under Cooperative Agreement No. 7DNANB4H1521, awarded by the U.S. Department of Commerce, National Institute of Standards and Technology. The U.S. Government has certain rights in the invention.

The invention relates to optoelectronic devices, and in particular to optoelectronic couplers.

BACKGROUND OF THE INVENTION

With the ever expanding need for high-speed information transfer at low cost, parallel optoelectronic data links have become increasingly attractive. A crucial component in such a link is the optical subassembly (OSA) which provides the interface between the optically active chip (lasers or LEDs for the transmitter; detectors for the receiver) and the ferrule carrying the terminated fibers. The OSA must consist of accurately aligned precision parts which permit the optical power emanating from the laser(s) to be efficiently transferred to the fiber(s) for the transmitter optical subassembly (TOSA), or the optical power emanating from the fiber(s) to be efficiently transferred to the detector(s) for the receiver optical subassembly (ROSA). These parts must be fabricated by techniques which render them inexpensive, but which maintain the required accuracy. One of the components of the OSA which requires the most careful design is the optical coupler. For the case of a single-channel (non-parallel) link, the optical coupler is typically a lens which is correctly designed and positioned to give the maximum useable coupling efficiency (CE) between the optical fiber and the optically active chip (see, e.g., H. van Tongeren, "Packaging of Long-Wavelength Fibre Optic Communication Lasers", Phillips J. Res., vol. 45, pp. 243–254, 1990).

In some applications, it is necessary to bend the light path by 90 degrees between the optical fiber and the active chip. A typical reason for such a bend is the necessity to maintain the fiber axis parallel to the substrate supporting the optically active chip (ultimately the card on which the optically active chip resides), while the light emanating from the chip (transmitter) or impinging on it (detector) is perpendicular to the substrate. One known solution to this problem is represented by an assembly comprising a prism or mirror and a suitably positioned lens, so that the light can be both focussed and redirected properly. See, e.g., A. J. Heiney et al, "Design and Characterization of a Novel Fiber Optic Coupling Device for Data Communication Applications", 43d Electronic Components & Technology Conference, Orlando FL, May 1993, post-deadline paper.

While the lens-prism/mirror solution may be acceptable for a single-channel link, low-cost fabrication of optical couplers using this approach is impractical for a parallel link, particularly when the channel-channel period (i.e., distance from a point in one channel to a corresponding point in an adjacent channel) is about 500 microns or smaller. It becomes very difficult to make such a small-scale lens array at low cost because machining methods do not permit precise delineation of the optically smooth, ultra-small radius surfaces needed to make such tiny lenses (whether the lens itself or a mold used to make the lens is being considered). Although special techniques have been employed to make lens arrays (N. F. Borrelli and D. L. Morse, "Microlens Arrays Produced by a Photolytic Technique", Applied Optics, vol. 27, pp. 476–479, 1988.), such techniques do not permit low-cost fabrication of small scale lens arrays which are required for parallel optoelectronic data links.

Thus, it is clear that a need has arisen for an inexpensive optical array capable of directing light from a source element to a receiving element.

SUMMARY OF THE INVENTION

One aspect of the invention is an optical unit for transferring an optical signal from an entrance region, external to the optical unit, to an exit region, also external to the optical unit. The optical unit comprises an optical element, the optical element comprising: a first transmitting surface; a second transmitting surface not coplanar with the first transmitting surface; a first reflecting surface substantially perpendicular to the first transmitting surface and connecting the first and second transmitting surfaces; a second reflecting surface substantially parallel to the first reflecting surface and coupling the first and second transmitting surfaces; and a shaped reflecting surface adjoining the first and second reflecting surfaces and the first and second transmitting surfaces.

BRIEF DESCRIPTION OF THE DRAWING

Figures

FIGS. 1a, 1b and 1c are various views of an optical coupler in accordance with the invention.

FIG. 3 is a perspective view of an optical array in accordance with the invention.

FIG. 5b is another perspective view of the housing of FIG. 5a.

FIGS. 7a, 7b, 7c and 7d represent another embodiment of an optical array in accordance with the invention.

FIGS. 8a and 8b show how two optical couplers in accordance with the invention can be interleaved.

DETAILED DESCRIPTION OF THE INVENTION

The inventors have found that a low-cost optical coupler for a parallel link which incorporates a 90 degree bend can be fabricated by use of reflecting, rather than inline (lensed), optics. A point light source, positioned at one focus point inside an ellipsoid having a reflecting wall, the light being directed toward the reflecting wall, will form a point focus at the other geometric focus point of the ellipsoid. While it is not practical to make an array of true ellipsoids, it is possible to approximate this geometry at a reasonable cost. Thus, in accordance with the present invention, each channel of an optical array comprises a thin plate of transparent material with a shaped back. In one embodiment, the shaped back will be shaped to approximate in its optically active region a portion of an ellipsoid (the shaped back may, in fact, be planar near its ends to accommodate connection with its housing). It will be understood that a cylindrically shaped back (i.e., constituting a portion of a toroid) can also be used effectively. Also useful would be a back that is a portion of an elliptical cylinder, and therefore has a pair of line foci. The plate, which preferably is solid, in one embodiment also has a pair of opposing planar sidewalls adjoining the shaped back at substantially right angles to the shaped back.

Figure 6:
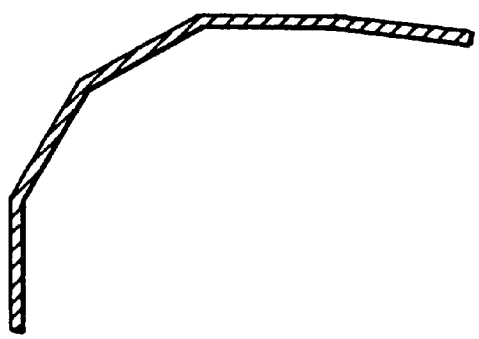
FIG. 6 is a cross-sectional view of another embodiment of the coupler of the present invention.

FIGS. 1a–1c each show a single plate, or coupling element, of one embodiment of the optical coupler of the present invention. The coupling element includes a shaped back 2, having an optically active portion 2a which approximates the shape of a portion of an elliptical cylinder. FIG. 6 shows another embodiment of the invention, in which the shaped back generally has the shape of a portion of an elliptical cylinder, but is actually comprised of a plurality of planar areas which together form this general shape.

The coupler of FIGS. 1a–1c further comprises a pair of opposing planar sidewalls 4 each substantially perpendicular to the back 2 (only one planar sidewall can be seen in FIGS. 1a–1c). The ends 2b of the shaped back 2 may be planar, or they may constitute a further portion of the elliptical cylinder containing the optically active portion.

As shown in FIG. 1c, the coupling element also includes a first transmitting surface 6 and a second transmitting surface 8. In a preferred embodiment, surfaces 6 and 8 are planar, and substantially perpendicular to one another, although neither must necessarily be the case. The exact orientation of the transmitting surfaces with respect to one another depends upon the desired angle at which the incoming light is to be diverted. That is, it may be desirable in some applications to redirect the light by an angle that is greater than or less than 90 degrees. It should be clear to those skilled in the art that this can be achieved in accordance with the invention.

The transmitting surfaces 6 and 8 can themselves be shaped. For example, it would be advantageous if a surface such as 6 or 8 was non-planar, convex (i.e., protruding outward from the volume of the coupler, and forming a portion of a cylinder, elliptical cylinder or ellipsoid), for example, so as to further improve the efficiency with which light is coupled from the source element (laser or exit surface of the coupler) to the receiving element (entry plane of coupler or detector). In one embodiment, surfaces 6 and 8 are planar and are each generally perpendicular to vertical walls 4.

The vertical walls 4 and back 2 are preferably coated with a reflective material, such as aluminum. By controlling the amount of reflective material on these surfaces, various coupling elements in an array can have different mechanical and optical characteristics. It should be noted, however, that the entire surface of back 2 need not be coated. Rather, only a portion near the center of the surface must be coated since the center will be the most likely region to receive light from the surfaces 6 and 8. It should also be noted that no reflective coating is necessary at all if the back and sidewalls are not in substantial contact with any material that would prevent these surfaces from reflecting by total internal reflection. For example, no reflective coating would be necessary if the reflective surfaces were surrounded by air. In such cases, adequate reflectivity can be provided by total internal reflection alone.

Figure 2:
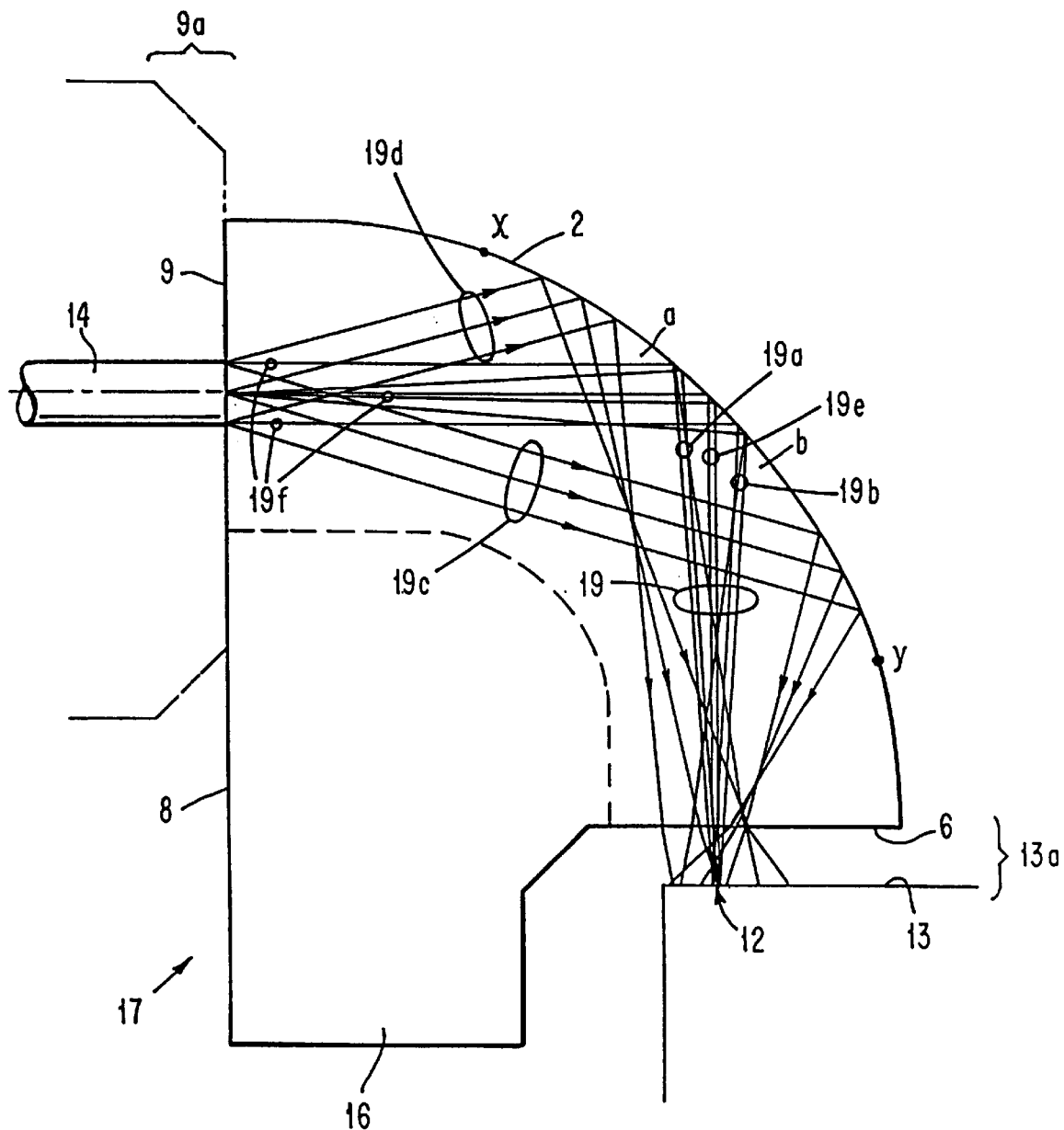
FIG. 2 is a cross-sectional schematic view of an optical coupler in accordance with the invention.

In an embodiment of the invention in which the coupling element is shaped as a portion of an elliptical cylinder, light from a point at a first focus of an ellipse formed by the intersection of an imaginary plane (located half-way between the reflective walls 4 of the coupling element, i.e., the plane of FIG. 2) and the elliptical cylinder will reflect off the reflective coating and will be focussed along a line passing through a second focus of the ellipse, this line being parallel to the axis of the elliptical cylinder. The line foci of the elliptical cylinder of which the optically active region 2a forms a part preferably are positioned proximate surfaces 6 and 8. However, some light originating from a source positioned proximate to surface 6 or 8 may diverge and, hence, not be directed toward the back 2. Instead, the light may diverge after exiting the laser, and strike sidewalls 4. This divergence can be seen in one plane in FIG. 2, which is a cross-sectional view of an array in accordance with the invention. (In a preferred embodiment of the invention, the divergence will be approximately 0.1–0.2 NA for the transmitter, and about 0.35 NA for the receiver.) Also note that the light will be redirected to the normal of surface 6 because of refraction. Thus, reflective walls 4 are provided to prevent cross-talk among adjacent optical elements and also to recapture light that would otherwise be lost into useable signals. That is, a ray from the source which first strikes a reflective planar wall may be reflected several times between the two parallel planar walls, but eventually the ray may hit the back 2 and may then be properly focussed on the receiver, which is positioned at (or nearly so) the line focus of the elliptical cylinder. (For such a ray it may be helpful to visualize the emitted ray as having a component in the plane of FIG. 2 as well as a component normal to that plane. The in-plane component is focussed by the back; the normal component is reflected from one or both of the two parallel planar walls.).

An optical coupler in accordance with the present invention will preferably be constructed of a material having a transmissivity of about 98% (ignoring surface losses), but a transmissivity as low as 50% will be acceptable. A preferred material is polyethersulfone. This material is attractive because it has adequate optical transmission characteristics at the wavelengths of interest (850 nm) and good moldability. Other materials that can be used include polysulfone, acrylic, polycarbonate, polyetherimide and any other transparent thermoplastic. Transparent thermoset epoxies may also be used.

FIG. 2 shows the coupling element, along with a laser 12 (a surface emitting device such as a VCSEL—vertical cavity surface emitting laser) and optical fiber 14. It can be seen that a beam emanating, e.g., from an entrance plane 13 (in an entrance region 13a) constituting the surface of laser 12 positioned along one line focus of the elliptical cylinder, will diverge somewhat and reflect off the reflective surface of the back 2 of the element. Because of the elliptically cylindrical shape of the optically active region (between points x and y in FIG. 2) of the back 2, the beam will be deflected to a line focus in exit plane 9 in exit region 9a near surface 8. Preferably, surface 8 is located proximate to and substantially parallel with exit plane 9. This design allows efficient optical power transfer from surface 6 to surface 8 of the optical element. In a preferred embodiment, the numerical aperture of the set of rays of the optical signal that enters the optical element is substantially the same as the numerical aperture of the set of rays that leaves the element; that is, the absolute value of the magnification will be approximately 1×. It will be understood that the absolute value of the magnification need not be 1× for the invention to operate, however.

For-channel-channel periods of 250 or 500 microns, plate thicknesses of a half-period are preferred, i.e., 125 or 250 microns, respectively, with a width in the region populated by rays 19 (between points a and b in the plane of FIG. 2) of roughly twice the period, i.e., 500 microns or 1 mm, respectively. In actuality, it would be preferable to have the thickness of the plate be 200 microns or less, but the half-period thickness represents a practical compromise when considering the mechanical challenges of fabricating the array. A part with such dimensions must be carefully and uniformly fabricated to have the necessary precision and smooth, non-scattering surfaces. This is accomplished by using optically-polished mold surfaces, with surface roughness about +/−0.2 microns deviation from the shaped surface, and the shaped surface preferably deviating from the desired shape by no more than about 10 microns.

In accordance with another aspect of the invention, the optical coupler is constructed of an array of coupling elements like the one shown in FIG. 1. The array can be arranged with its associated optical receivers and transmitters such that some of the optical units in the array are used to receive optical signals from an external source, while some are used for transmission to an external source. Similarly, a particular unit can itself be used alternately (in time) as either a receiving unit or a transmitting unit.

In one embodiment of the invention, injection molding is used to construct the array, and a preferred fabrication method proceeds in the following sequence:

1. The array of coupling elements 18 comprising the optical subassembly 17 of the invention is first molded at high temperature and pressure. As can be seen in FIG. 3, a backbone 16, or "support rod", is molded integrally with the coupling element array. The backbone 16 holds the array together as a unit and mechanically links the individual plates together; optically, the plates are separate. The backbone 16 is positioned in a region having few if any optical rays (once the array is installed) so that it does not interfere with the attainment of a high CE value. That is, as can be seen in FIG. 2, few (preferably none) of the rays of light emitted from the laser (or fiber, in the case of a receiver) come close to the backbone. It should be noted that ray bundles 19a, 19b, 19c and 19d depicted in FIG. 2 represent the light emanating from the laser and the fiber at a point where the optical power per unit solid angle is well below the maximum optical power per unit solid angle (as represented by bundles 19e and 19f). Thee backbone also serves a useful function in correctly positioning the optical coupler during use, such that the surface of the chip is at one focus of the imaginary elliptical cylinder of which the optically active region 2a forms a part. Thus, if the bottom 53 of the backbone 16 is placed in contact with a suitable reference surface, the correct distance between surfaces 6 and 13 can be insured (FIG. 2), because chip thickness, backbone size and epoxy thickness are known. In a preferred embodiment, the backbone will be formed from the same material and in the same mold as the optical coupling elements.

2. The plate array is then metallized by vacuum metallization. While it is relatively simple to metallize the backs of the plates, vacuum metallization of the sidewalls is more difficult because the presence of adjacent plates can cause shadowing effects on any given plate. Experiments have shown, however, that if the metallization is directed not parallel to the planar surfaces of the plates, (i.e., surfaces 4 of FIGS. 1a–1c) but at an appropriate angle depending upon the spacing between the plates, and the depth to which coating is desired, adequate metallization will be applied in the region of each plate near the back associated with high ray density, i.e., where a majority of the rays will strike. When depositing at an oblique angle either both surfaces must be coated simultaneously using two deposition sources, or the device must be mechanically rotated during deposition using one deposition source. Deposition techniques such as vacuum evaporation and magnetron sputtering can be used for this metallization process in order to avoid overheating the plastic material. Metals having high reflectivity for the wavelength being used must be employed; for wavelengths around 850 nm either aluminum or copper may be used. In either case, measures such as proper temperature control and deposition rate must be taken to insure good adhesion and a smooth deposit. It will be understood that the stated wavelength represents the wavelength of a particular laser chosen for a particular application. Other laser sources can be employed with similar effect, regardless of wavelength. In such alternative cases, it may be desirable to employ other materials for constructing the coupler, but the selected material must exhibit the qualities discussed above for the wavelengths of interest.

Figure 4:
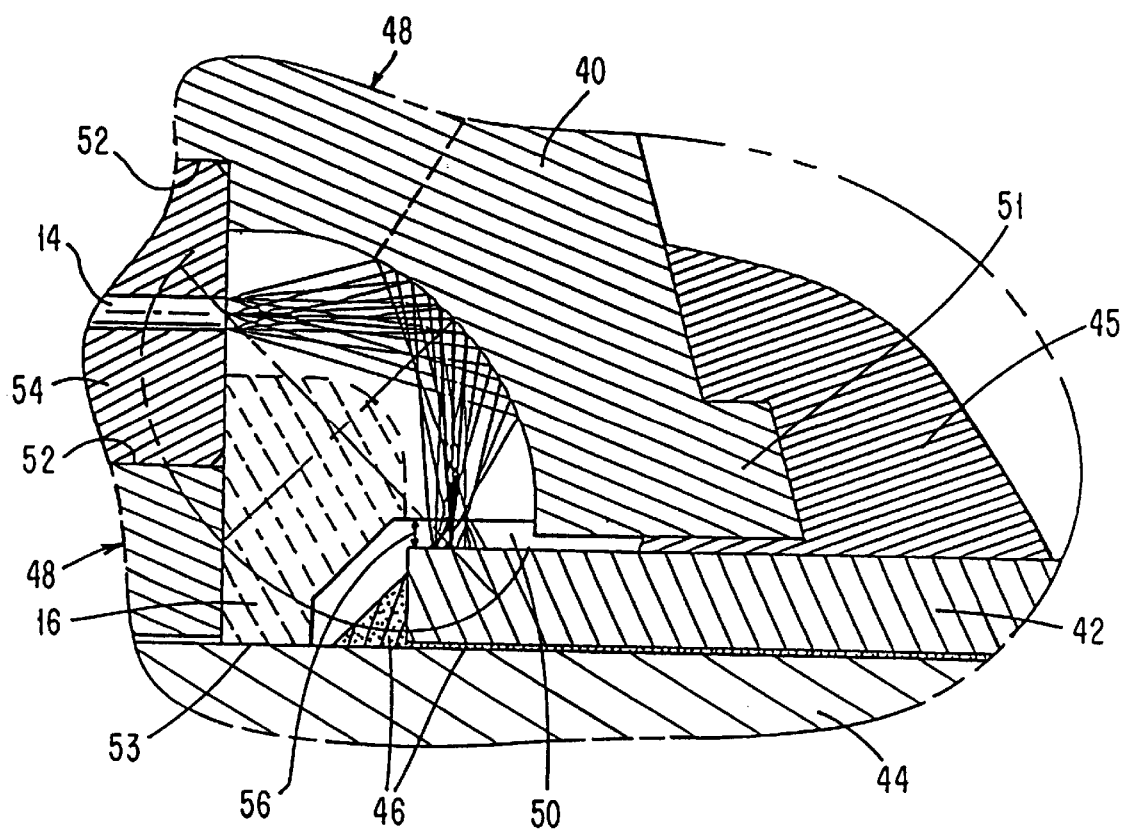
FIG. 4 is a detailed cross-sectional view of an optical assembly in accordance with the invention.

3. A second structure is then made and bonded to the array to complete the optical coupler. This structure is shown in cross-section in FIG. 4 and in perspective in FIGS. 5a and 5b. The second structure includes a stiffening structure 40 (which constitutes a portion of housing 48), secured to the chip 42 by means of potting material 45. The chip 42 is secured to the substrate 44 with a thin layer of epoxy, extruded portions of which can be seen as 46. The optical element resides within the housing 48. The second structure serves to impart stiffness to the assembly, and also has two important features:

a) A bore 52 (shown in perspective in FIG. 5b) is created in the housing 48 for insertion of the ferrule 54 of the multifiber optical cable.

b) An arm 51 of the structure provides a cavity 50 between the optical coupler and the optically active chip 42. The gap may be filled with air or with a passivating, compliant and substantially transparent material (silicone gel is preferred). The latter option protects the optically active chip 42 from the outside environment. The cavity/gel configuration eliminates direct, mechanical contact between the coupler and the chip, along with the accompanying mechanical stress that would occur if they were to come into contact. If a gel is used, it will be preferable that it have a refractive index such that it improves coupling efficiency. The gap 56 between the plate and the chip will be about 100–200 microns when air is used to fill the cavity, but can be much larger (200–500 $\mu$m) if gel is used to fill the cavity. A third option is to apply the gel (or other suitable material) in a thin layer approximately 25 microns thick on the chip, while maintaining an air gap between the gel and the optical coupler.

The stiffening structure may be fabricated by one of two methods:

(a) In one embodiment, the array can be placed in a mold for an over-molding step. Material is forced into the interstices between the plates over the metallized surfaces, thereby strengthening the structure. The double-molding operation must be carried out with care to insure that the second molding is precisely aligned to the first, and that the second molding step does not distort the plate array fabricated in the first molding step. For this purpose, two different materials, with different heat-deflection temperatures or melting point temperatures, for example, are chosen for the two steps. Thus the array will be molded at the higher temperature using a high-temperature material, while the overmolding is carried out at a lower temperature with a lower temperature material. Thus, the material used for constructing the stiffening structure must have a lower melting point than the material used for constructing the array. Preferred stiffening structure materials are polysulfone and filled polysulfone. Alternative materials include polycarbonate, polyphenylene sulfide, polyphenylene oxide, polyphenylene ether and polythalamide. (Although any other plastic material exhibiting acceptable molding and adhesion characteristics can be employed with similar effect.)

Figure 5A:
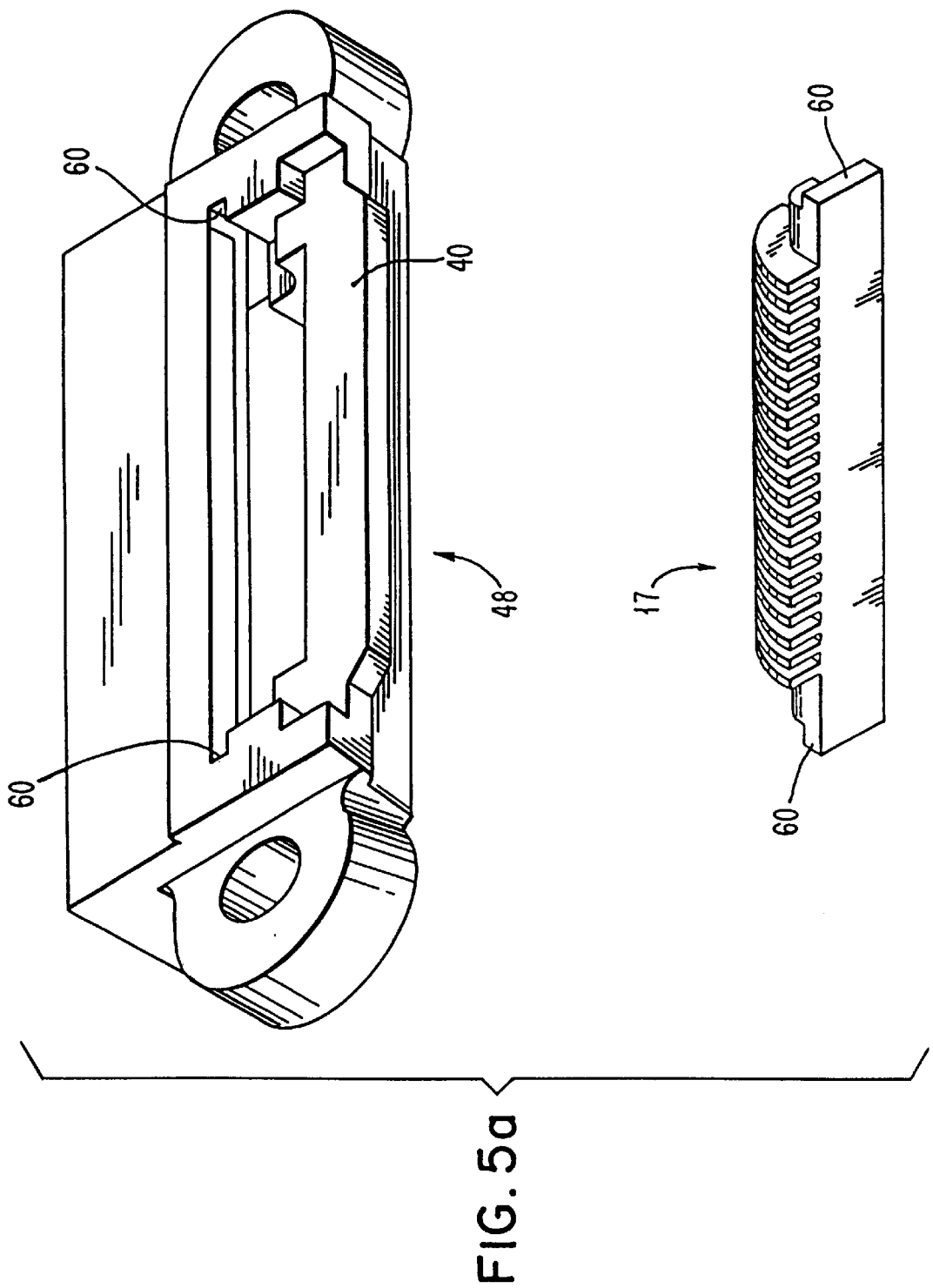
FIG. 5a is a perspective view of the optical array and its housing.
Figure 5B:
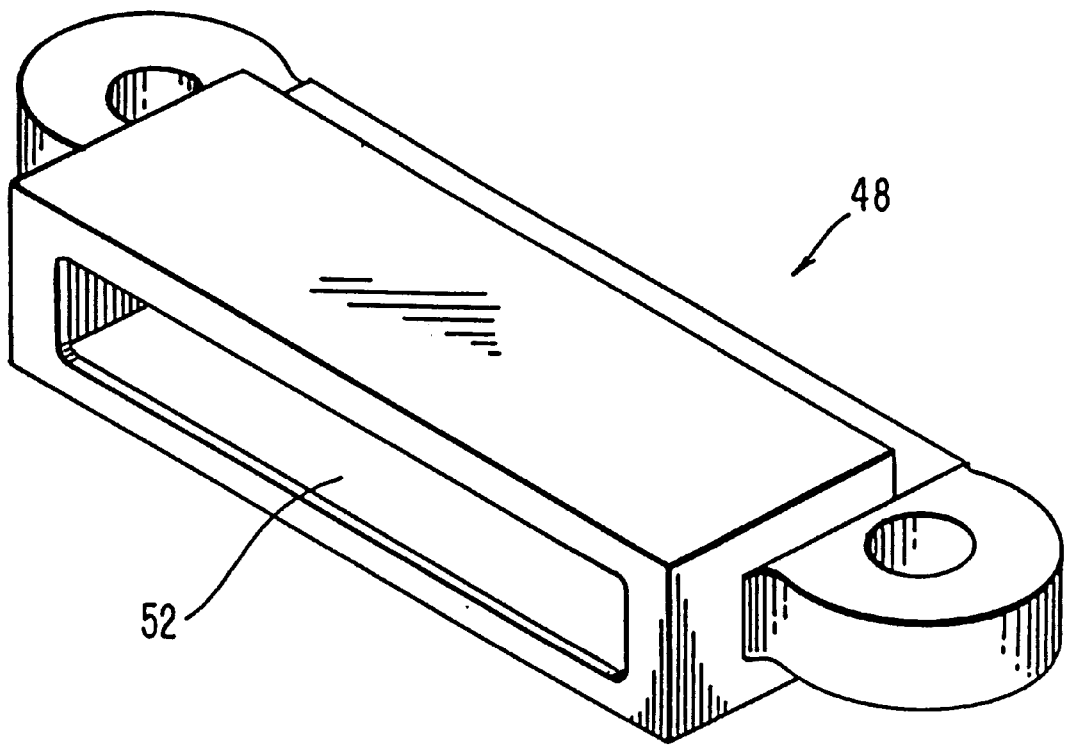

(b) In a preferred embodiment, as shown in FIG. 5a, the stiffening structure is molded separately out of any suitable plastic, which may be reinforced with carbon, silica, glass fiber, fiberglass, metal powder or other media, then mechanically fastened to the plate array, e.g., by a "snap-in" mechanism. This snap-in mechanism comprises tabs 60 at the ends of the optical subassembly 17 which are inserted into slots 60 in the housing, as shown in FIG. 5a. Here again care must be taken with the tolerances (+/−25 μm) of the two parts to maintain precision alignment. Referring now to FIGS. 7a–7d, another embodiment of the invention will now be described. FIGS. 7a and 7b show, respectively, side and plan views of another embodiment of an optical coupling element in accordance with the invention. The element of FIGS. 7a and 7b includes an optical coupler 704, which can have any of the characteristics discussed above with respect to FIGS. 1a–1c. The element also includes an integral mounting feature 702, having alignment apertures 706 therethrough. As can be seen most clearly in the side view of FIG. 7a, the integral mounting feature has a thickness greater than that of the coupler 702. The integral mounting feature can be molded in a single molding process with the optical coupler, using the same material, to form the integral unit shown in FIG. 7c.

The purpose of the integral mounting feature 702 is to allow a convenient yet precise means for assembling a plurality of optical coupling elements of FIG. 7a into an array. The plurality of elements can be assembled, for instance, by laminating the elements together with an epoxy. To ensure proper alignment, alignment rods such as 707 in FIG. 7d can be inserted into the apertures 706 during the lamination process.

FIG. 8a shows how two arrays of optical couplers in accordance with the invention can be interleaved. FIG. 8b is a bottom view of the interleaved arrays. With the interleaved arrays of FIGS. 8a and 8b an optical signal directed toward a surface 6B of an optical coupler in the interleaved arrays will be directed according to the configuration of that coupler. Thus, an incoming array of optical signals can be split such that a plurality of the signals are directed in a first direction, and a plurality in a second direction. Conversely, optical signals directed in opposite directions and entering surfaces 6A from opposite directions will emerge directed in the same direction from surfaces 6B of the array.

Figure 9A:
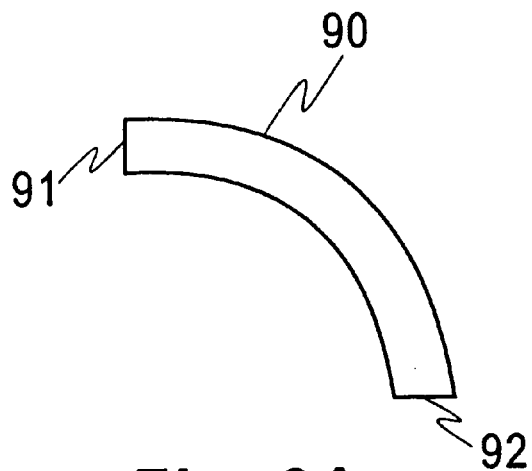
FIGS. 9(a)–9(d) show another embodiment of the invention.

Referring now to FIGS. 9(a) and (b), a further embodiment of the invention will now be described. FIG. 9(a) shows a side view of an of optical coupling element 90. Coupling element 90 is shaped such that a first transmitting surface 91 is substantially perpendicular to a second transmitting surface 92. The result is that light entering, for example, transmitting surface 91 will be redirected within the coupling element such that the light will exit the coupling element via transmitting surface 92 at an angle of approximately 90 degrees from the angle of entry into the coupler. Of course, it will be apparent that the particular relationship between the angle of entry and exit can be controlled by the degree of bend in the coupling element. The coupling element of FIGS. 9(a) and 9(b) can be made from the same materials described above with respect to other embodiments of the invention.

Figure 9B:
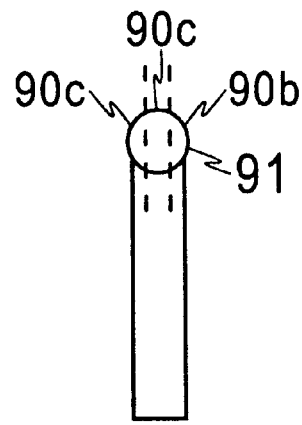

FIG. 9(b) shows a front view of the coupling element of FIG. 9(a). As can be seen, in this embodiment transmitting surface 91 is circular in shape (as is transmitting surface 92, although not visible in this view) as a result of the circular cross-section of coupling element 90. In addition, the coupling element comprises three functional surface regions 90a, 90b and 90c. Regions 90a and 90b function as reflective side regions of the coupling element, and region 90c functions as a shaped reflective surface joining the reflective side regions. Regions 90a, 90b, and 90c cooperate to reflect light entering, for instance transmitting surface 91 such that light will exit the coupling element via transmitting surface 92.

In one embodiment of the invention, region 90c will be coated with a reflective material, such as aluminum or copper, in order to facilitate the reflection of incoming light to the exit transmitting surface. Furthermore, regions 90a and 90b may be partially, substantially or completely coated with a reflective material such as aluminum or copper. The degree of necessary coverage depends upon desired performance of the coupling element. Where coupling efficiency is of primary concern, all or substantially all of regions 90a and 90b can be coated with a reflective material to maximize the percentage of light delivered to the exit transmitting surface as compared to the amount entering the entrance transmitting surface. Where a narrow bandwidth is desired, however, a smaller portion of the regions 90a and 90b can be coated with a reflective material—thus, less light will tend to "bounce around" within the coupling element prior to exiting. Light that otherwise would have bounced around will either be absorbed by an absorptive coating, or simply escape from the coupler. Where escape is undesirable, the remaining portions of regions 90a and 90b that are not coated with a reflective material will optionally be coated with a light absorbing material, such as filled polysulfone. The advantages of using a light absorbing material are: first, to absorb portions of the incoming light that might otherwise arrive at the exit transmitting surface later than other portions of the incoming light, thereby reducing the pulse width of the light datum; and, second, to prevent cross-talk with adjacent coupling elements when the coupling element forms part of an array of coupling elements.

Figure 9C:
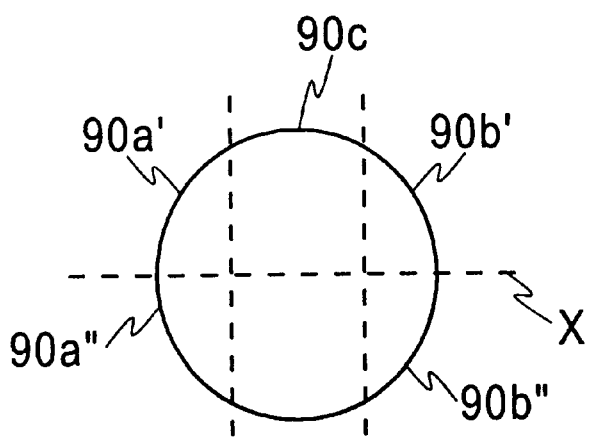

FIG. 9(c) illustrates the technique of selective use of absorptive and reflective coatings on regions 90a and 90b of coupler 90. In one example of this feature of the invention, the regions 90a' and 90b' (defined as the portions of regions 90a and 90b disposed above dashed line x) will be coated with a reflective material, while regions 90a" and 90b" will be coated with an absorptive material. It will be clear that line x can be raised or lowered to decrease/increase the portion of regions 90a and 90b coated with reflective material. It will also be apparent that an appropriate choice for bandwidth and coupling efficiency purposes might not require the use of any absorptive material at all.

Note that the while the coupling element of FIG. 9(a) preferably is a solid member, i.e., the material from which the coupling element is made acts as the light transmission medium.

In another embodiment of the invention, the coupling element can be hollow, such that an open passage connects the entrance and exit regions of the coupling element. In this case, air is the medium by which light is transmitted from one end of the coupling element to the other. In this alternative embodiment, the ends of the coupling element may or may not have a transmission surface through which light enters the hollow region of the coupling element. Thus, in a first alternative embodiment, the coupling element will resemble an open-ended pipe; in a second alternative embodiment, the coupling element will resemble a closed-ended pipe having an air cavity therein.

It will be clear that other embodiments of the invention described elsewhere herein (e.g., in FIG. 1) can benefit from selective use of reflective and absorptive coatings on the side surfaces thereof.

Figure 9D:
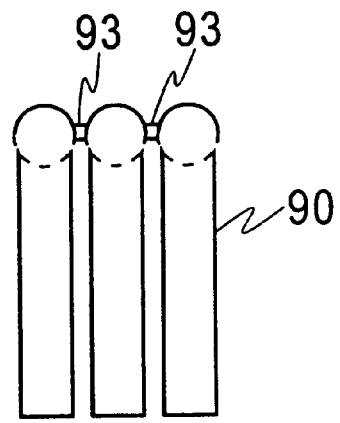

FIG. 9(d) shows a further embodiment of the invention. In particular, FIG. 9(d) shows a plurality of optical coupling elements 90 joined to form an array of elements. The elements are joined to adjacent coupling elements by means of a coupling node. Preferably, coupling node 93 will be formed of the same material as the coupling elements themselves, in a single coupling array molding step. The width of coupling nodes 93 can be selected so as to ensure proper spacing of one coupling element from an adjacent coupling element.

While the invention has been described in particular with respect to preferred embodiments thereof, it will be understood that modifications to the disclosed embodiments can be effected without departing from the spirit and scope of the invention.

What we claim as new, and wish to secure by Letters Patent, is:

1. An optical element for transferring an optical signal from an entrance region, external to the optical unit, to an exit region, also external to the optical unit, comprising:

a first transmitting surface;

a second transmitting surface not coplanar with the first transmitting surface;

a first surface substantially perpendicular to the first transmitting surface and connecting the first and second transmitting surfaces, a first portion of said first surface being substantially reflective, and a second portion of said first surface being selected from the group consisting of: substantially reflective and less-than-substantially reflective;

a second surface substantially perpendicular to the first transmitting surface and connecting the first and second transmitting surfaces, a first portion of said second surface being substantially reflective, and a second portion of said second surface being selected from the group consisting of: substantially reflective and less-than-substantially reflective; and a shaped reflecting surface adjoining the first and second transmitting surfaces.

2. An optical element for transferring an optical signal from an entrance region, external to the optical unit, to an exit region, also external to the optical unit, comprising:

a first transmitting surface;

a second transmitting surface not coplanar with the first transmitting surface;

a first surface region coupling the first transmitting surface and the second transmitting surfaces, a first portion of said first surface region being substantially reflective, and a second portion of said first surface region being selected from the group consisting of: substantially reflective and less-than-substantially reflective;

a second surface region coupling the first transmitting surface and the second transmitting surfaces, a first portion of said second surface region being substantially reflective, and a second portion of said second surface region being selected from the group consisting of: substantially reflective and less-than-substantially reflective; and a shaped reflecting surface region between the first and second surface regions and adjoining the first and second transmitting surfaces.

* * * * *